(12) United States Patent
O'Connor et al.

(10) Patent No.: US 7,033,487 B2
(45) Date of Patent: Apr. 25, 2006

(54) FCC CATALYST FOR REDUCING THE SULFUR CONTENT IN GASOLINE AND DIESEL

(75) Inventors: Paul O'Connor, Hoevelaken (NL); Gregory A. Pearson, Seabrook, TX (US); Jerry J. Springs, League City, TX (US); Dennis Stamires, Newport Beach, CA (US)

(73) Assignee: Albemarle Netherlands B.V., Amersfoort (NL)

( * ) Notice: Subject to any disclaimer, the term of this patent is extended or adjusted under 35 U.S.C. 154(b) by 27 days.

(21) Appl. No.: 10/603,274

(22) Filed: Jun. 25, 2003

(65) Prior Publication Data

US 2004/0029717 A1 Feb. 12, 2004

Related U.S. Application Data

(60) Provisional application No. 60/392,576, filed on Jun. 28, 2002.

(30) Foreign Application Priority Data

Sep. 4, 2002 (EP) .................. 02078742

(51) Int. Cl.
C10G 11/02 (2006.01)
C10G 11/05 (2006.01)

(52) U.S. Cl. .............. 208/120.01; 208/113; 208/118; 208/208 R; 208/254 R; 502/64; 502/68; 502/73; 502/74; 502/79; 502/84

(58) Field of Classification Search .......... 502/64, 502/68, 73, 74, 79, 80, 84; 208/113, 118, 208/120.01, 208 R, 254 R
See application file for complete search history.

(56) References Cited

U.S. PATENT DOCUMENTS

| | | | | |
|---|---|---|---|---|
| 4,153,534 A | | 5/1979 | Vasalos | 208/120 |
| 4,221,677 A | | 9/1980 | Vasalos et al. | 252/455 |
| 4,363,720 A | | 12/1982 | Hirschberg et al. | 208/120 |
| 4,458,026 A | | 7/1984 | Reichle | 502/80 |
| 4,522,704 A | | 6/1985 | Bertsche | 208/113 |
| 5,002,654 A | | 3/1991 | Chin | 208/121 |
| 5,565,400 A | * | 10/1996 | Holmgren | 502/328 |
| 6,028,023 A | * | 2/2000 | Vierheilig | 502/84 |
| 6,589,902 B1 | * | 7/2003 | Stamires et al. | 502/80 |
| 6,652,828 B1 | * | 11/2003 | Stamires et al. | 423/420.2 |
| 6,710,004 B1 | * | 3/2004 | Stamires et al. | 502/84 |
| 2002/0159940 A1 | * | 10/2002 | Stamires et al. | 423/326 |

FOREIGN PATENT DOCUMENTS

| | | |
|---|---|---|
| EP | 0 278 535 B1 | 2/1991 |
| EP | 0 609 971 B1 | 11/1998 |
| GB | 2 345 293 A | 7/2000 |
| JP | 11300210 A | 11/1999 |
| WO | 97/09113 | 3/1997 |
| WO | 99/49001 | 9/1999 |
| WO | 01/12570 A1 | 2/2001 |
| WO | 02/064499 A3 | 8/2002 |
| WO | 02/064504 A1 | 8/2002 |
| WO | 02/072474 A1 | 9/2002 |

OTHER PUBLICATIONS

Applied Catalysis A, *Sulphur Reduction of Fluid Catalytic Cracking (FCC Naphtha by an in Situ Zn/Mg(al) O FCC Additive*, Myrstad, et al, General 187 (1999) pp. 207-212.
Catalysis Today, *Cracking Catalyst Additives for Sulfur Removal from FCC Gasoline*, P-O.F. Andersson, et al, (1999), pp. 565-573.
Applied Catalysis B : Environmental 4 ; *Optimization of $SO_x$ Additives of FCC Catalysts based on $MgO-Al_2O_3$ Mixed Oxides Produced from Hydrotalcites*, A. Corma, et al, (1994), pp. 29-43.
Applied Catalysis A : General 192, *Effect of Nickel an Vanadium on Sulphur Reductoin of FCC Naphtha*, T. Myrstad, et al, (2000), pp. 290-305.
English Abstract of Ann. Chim., *Mechanisms of Reactions Catalyzed by Silica-Alumina, IV. Chemical Pretreatments of the Catalysts : new Catalytic Surfaces and Their Activity in Cumene Cracking*, Farne, et al, 68 (1978) pp. 481-496.
Search Report of Priority Application EP 02078742, dated Feb. 20, 2003.

* cited by examiner

*Primary Examiner*—Christina Johnson

(57) ABSTRACT

A catalyst composition comprising about 5–55 wt % metal-doped anionic clay, about 10–50 wt % zeolite, about 5–40 wt % matrix alumina, about 0–10 wt % silica, about 0–10 wt % of other ingredients, and balance kaolin. In metal-doped anionic clays, the additive, i.e. the metal dopant, is distributed more homogeneously within the anionic clay than in impregnated anionic clays, without separate phases of additive being present. Hence, abrasion of this catalyst composition will result in microfines poorer in additive than the prior art composition. Furthermore, the catalyst composition according to the invention results in a higher reduction of sulfur in fuels such as gasoline and diesel than is the case in compositions comprising impregnated anionic clay.

15 Claims, 7 Drawing Sheets

FCC CATALYST FOR REDUCING THE SULFUR CONTENT IN GASOLINE AND DIESEL

CROSS REFERENCE TO RELATED APPLICATIONS

This application claims priority form U.S. Patent Application No. 60/392,576, filed Jun. 28, 2002, and EP Patent Application No. 02078742.0, filed Sep. 4, 2002.

BACKGROUND OF THE INVENTION

1. Field of the Invention

The present invention relates to a catalyst composition comprising zeolite, alumina, anionic clay, and kaolin, its preparation, and its use in FCC.

2. Prior Art

Environmental concerns have resulted in legislation limiting the sulfur content in fuels, such as gasoline and diesel. Sulfur, when present in gasoline, not only contributes to SOx-emissions, but also poisons car engine exhaust catalysts.

One way of reducing these sulfur levels is hydrotreating. However, such a process requires substantial capital investments and operating costs. It would be more desirable to reduce the sulfur content in situ, i.e. during processing in the FCC-unit.

WO 99/49001 and T. Myrstad et al., *Appl. catal. A* 187 (1999) 207–212 disclose such an in situ process using a composition comprising a hydrotalcite material impregnated with a metal additive, i.e. a Lewis acid, preferably Zn. According to this document, the impregnated hydrotalcite material can be incorporated into the matrix of an FCC catalyst, or can be used as a separate compound next to an FCC catalyst.

Impregnation generally leads to (a) an inhomogeneous distribution of the metal additive in the hydrotalcite material whereby the metal is mainly deposited on the outer surface of the hydrotalcite particles and/or (b) precipitation of the metal additive as a separate phase next to the hydrotalcite material The so-obtained metal distribution facilitates leaching of the metal additive into the aqueous suspension containing the other catalyst ingredients during the preparation of the catalyst composition. Such leaching leads to a decrease in metal content of the anionic clays (with consequently a loss in catalytic activity) and may result in precipitation of the metal additive on one of the other catalyst ingredients present in the suspension, e.g. the alumina. The presence of such metal-containing alumina in the catalyst composition can lead to several side reactions (e.g. coke formation) during use in FCC.

During use of the catalyst composition—which consequently leads to abrasion of the catalyst composition—microfines (dust) are formed. If the metal additive is located mainly on the outer surface of the anionic clay phase and/or if the additive is present as a separate phase within the catalyst, the microfines will contain relatively large amounts of the metal additive. This is environmentally undesired, especially when the additive is a heavy metal-containing compound. Furthermore, with the removal of the metal additive from the catalyst, catalytic activity will be lost.

SUMMARY OF THE INVENTION

In one embodiment, the present invention comprises a catalyst composition comprising about 5–55 wt % metal-doped anionic clay, about 10–50 wt % zeolite, about 5–40 wt % matrix alumina, about 0–10 wt % silica, about 0–10 wt % of other ingredients, and the balance kaolin.

In a second embodiment, the present invention comprises a process for the preparation of the above catalyst composition wherein zeolite, metal-doped anionic clay, alumina, kaolin, and optionally silica and other ingredients are mixed in aqueous suspension and subsequently shaped to form particles.

In a third embodiment the present invention comprises a process for the production of gasoline and/or diesel having a reduced sulfur content and/or a reduced nitrogen content comprising contacting a hydrocarbon feedstock with the catalyst composition of claim 1 at fluid catalytic cracking conditions.

Other embodiments of the present invention comprise details relating to compositions, reaction ingredients and conditions, all of which are set forth hereinbelow.

DETAILED DESCRIPTION OF THE INVENTION

Preferably, the composition comprises about 10–35 wt % of metal-doped anionic clay, about 20–30 wt % of zeolite, about 10–30 wt % matrix alumina, about 0–10 wt % of silica, about 0–10 wt % of other ingredients, and balance kaolin.

In this specification, the term "metal-doped anionic clay" refers to an anionic clay not containing a binder material, which anionic clay has been formed in the presence of an additive (the dopant). The anionic clay has been prepared by (a) aging an aqueous suspension comprising a divalent metal source and a trivalent metal source, at least one of them being water-insoluble, to form an anionic clay, and optionally (b) thermally treating the anionic clay obtained from step (a) and rehydrating the thermally treated anionic clay to form an anionic clay again.

In metal-doped anionic clays, the metal additive, i.e. the metal dopant, is distributed homogeneously within the anionic clay, without separate phases of metal being present. Hence, microfines resulting from abrasion of this catalyst composition will contain less of the metal additive than microfines resulting from the prior art catalyst composition.

Furthermore, less metal will leach out from these doped anionic clays during catalyst preparation than from impregnated anionic clays.

Figure 1:
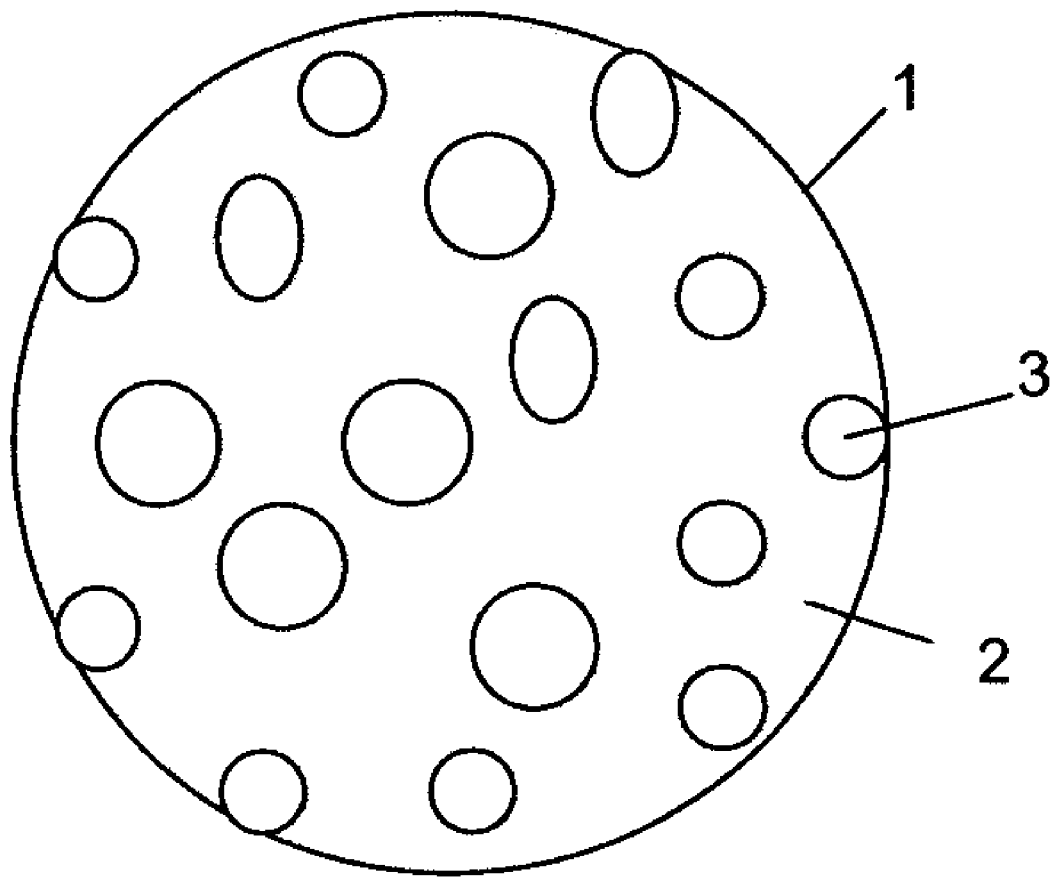
FIG. 1 illustrates a catalyst particle (1) having a continuous phase (2) and a discontinuous phase (3).

The alumina serves as matrix material. This means that the alumina is present in the continuous phase, while the metal-doped anionic clay is present in the discontinuous phase. The difference between the continuous and the discontinuous phase is illustrated in FIG. 1.

This situation is opposite to that of WO 01/12570, which discloses an anionic clay-containing shaped body in which the anionic clay constitutes the continuous phase, while the binder material (e.g. alumina) is present in the discontinuous phase. In these shaped bodies it is the anionic clay which serves as matrix material. Such bodies can only be prepared from anionic clay that has good binding properties.

Most anionic clays, however, have poor binding properties. As in the catalyst composition according to the present invention alumina serves as matrix material, this offers the possibility of using any type of anionic clay, either binding or non-binding.

The fact that alumina serves as matrix material does not exclude other binding materials, e.g. silica and/or kaolin, from serving as matrix material as well.

It has been found that the use of catalyst compositions according to the invention results in a higher reduction of the sulfur content in fuels (e.g. gasoline and diesel) than the use of compositions comprising impregnated anionic clay in accordance with WO 99/49001.

The catalyst composition according to the invention can be prepared by mixing zeolite, metal-doped anionic clay, alumina, kaolin, and the optional silica in an aqueous suspension, followed by shaping the material to form particles. The pH of the suspension preferably is between about 4 and about 8, more preferably between about 5 and about 7.

Suitable shaping methods include spray-drying, granulation, beading, or any other shaping method suitable for the preparation of FCC catalysts. The amount of liquid present in the precursor mixture used for shaping should be adapted to the specific shaping step to be conducted. It might be advisable to (partially) remove the liquid used in the precursor mixture and/or add additional or other liquid, and/or change the pH of the precursor mixture to make the precursor mixture gellable and thus suitable for shaping. Various additives commonly used in the various shaping methods such as extrusion additives, binders, and fillers may be added to the precursor mixture used for shaping.

Other ingredients, such as metal traps or combustion promoters, pore regulating agents, cationic clays, and other known additives used in FCC catalyst preparation including phosphates may be added to the aqueous suspension mentioned above, or they may be impregnated on the shaped catalyst composition.

The final catalyst particles preferably have an average particle size of about 50–100 microns, which makes them suitable for use in FCC units.

Metal-Doped Anionic Clay

Anionic clays have a crystal structure which consists of positively charged layers built up of specific combinations of divalent and trivalent metal hydroxides between which there are anions and water molecules. Hydrotalcite is an example of a naturally occurring anionic clay wherein Mg is the divalent metal, Al is the trivalent metal, and carbonate is the predominant anion present. Meixnerite is an anionic clay wherein Mg is the divalent metal, Al is the trivalent metal, and hydroxyl is the predominant anion present.

A variety of terms is used to describe the material that is referred to in this specification as an anionic clay, such as hydrotalcite-like material and layered double hydroxide. In this specification we refer to these materials as anionic clays, comprising within that term hydrotalcite-like materials and layered double hydroxides.

The difference between impregnated and doped anionic clays is that doped anionic clays are prepared by a process wherein the metal additive(s) (hereinafter referred to as metal dopant(s)) is/are present during the formation of the anionic clay, whereas impregnation is always performed after the formation of anionic clay has been completed.

The preparation of metal-doped anionic clay involves aging an aqueous suspension comprising a divalent metal source and a trivalent metal source, at least one of them being water-insoluble. If so desired, the formed anionic clay may be thermally treated (calcined) and then rehydrated to form an anionic clay again.

The dopant(s) is/are introduced in any one of these process steps, e.g. before or during aging or, if a rehydration step is performed, before or during rehydration. A combination of various addition moments can also be applied. The dopant(s) can be added to the aging suspension either separately or as already present in the insoluble divalent and/or trivalent metal source. In the latter case use is made of a metal-doped divalent and/or trivalent metal source.

The term aging refers to treatment of the suspension at thermal or hydrothermal conditions for about 30 minutes to about 3 days. In this context, hydrothermal conditions mean in the presence of water (or steam) at temperatures above about 100° C. and pressures above atmospheric, e.g. autogeneous pressure. Thermal conditions refer to temperatures between about 15 and about 100° C. and atmospheric pressure.

The preparation of metal-doped anionic clay can be conducted batch-wise or in a continuous mode, optionally in a continuous multi-step operation. The process can also be conducted partly batch-wise and partly continuously.

During this process, acids or bases can be added, for example to control the pH.

If an excess of divalent and/or trivalent metal source is present during aging, compositions of anionic clay and unreacted (meaning: not reacted to anionic clay) divalent and/or trivalent metal source can be formed. Such compositions can for instance comprise Mg—Al anionic clay and boehmite and/or brucite. These compositions can suitably be used in the catalyst composition according to the invention.

After the aging step, the anionic clay is optionally thermally treated to form a solid solution and/or spinel, followed by rehydration of the solid solution to form an anionic clay again. This thermal treatment and rehydration increase the physical strength of the particles.

The thermal treatment can be conducted in an oxygen-containing atmosphere, in a hydrogen-containing atmosphere, in an inert atmosphere or in steam at temperatures varying from about 150° to about 900° C. for a time ranging from a few minutes to about 24 hours.

Rehydration is performed by contacting the thermally treated material with a polar liquid, preferably water, at thermal or hydrothermal conditions, preferably at about 60–95° C. As mentioned before, metal dopant(s) can be present in the polar liquid during this rehydration step.

During preparation of anionic clay, irrespective of the preparation method used, the solids involved (e.g. solid trivalent metal source, solid divalent metal source, mixtures thereof) can be milled. In this specification the term "milling" is defined as any method that results in reduction of the particle size. Such a particle size reduction can at the same time result in the formation of reactive surfaces and/or heating of the particles. Instruments that can be used for milling include ball mills, high-shear mixers, colloid mixers, and electrical transducers that can introduce ultrasound waves into a slurry. Low-shear mixing, i.e. stirring that is performed essentially to keep the ingredients in suspension, is not regarded as "milling". If this milling is performed in suspension, metal dopant(s) can be added during the milling.

It is also possible to mill the formed anionic clay.

Suitable trivalent metals for the preparation of metal-doped anionic clays include aluminium, gallium, indium, iron, chromium, vanadium, cobalt, manganese, cerium, niobium, lanthanum, and combinations thereof.

Suitable gallium, indium, iron, chromium, vanadium, cobalt, cerium, niobium, lanthanum, and manganese sources are their respective oxides, hydroxides, carbonates, bicarbonates, hydroxycarbonates, acetates, hydroxyacetates, nitrates, chlorides, chlorohydrates, alkoxides, and clays containing the desired metal.

Suitable aluminium sources include aluminium oxides and hydroxides such as transition alumina, aluminium trihydrate (Bauxite Ore Concentrate, gibbsite, bayerite) and its thermally treated forms (including flash-calcined aluminium trihydrate), sols, amorphous alumina, and (pseudo)boehmite, aluminium-containing clays such as kaolin, sepiolite, and bentonite, modified clays such as metakaolin, and/or alumina salts such as aluminium nitrate, aluminium chloride, aluminium chlorohydrate, and sodium aluminate.

It is noted that a water-insoluble trivalent metal source has to be used if the divalent metal source is water-soluble.

Preferred trivalent metal sources are oxides, hydroxides, carbonates, and hydroxycarbonates, as these materials are relatively inexpensive. Moreover, these materials do not leave anions in the metal-doped anionic clay which either have to be washed out or will be emitted as environmentally harmful gases upon heating.

Suitable divalent metal sources include magnesium, zinc, nickel, copper, iron, cobalt, manganese, calcium, barium, and combinations thereof. Suitable zinc, nickel, copper, iron, cobalt, manganese, calcium, and barium sources are the respective oxides, hydroxides, carbonates, hydroxycarbonates, bicarbonates, acetates, hydroxyacetates, nitrates, chlorides, and clays containing the desired metal.

Suitable magnesium sources include magnesium oxides or hydroxides such as MgO, $Mg(OH)_2$, hydromagnesite, magnesium salts such as magnesium acetate, magnesium formate, magnesium (hydroxy) acetate, magnesium carbonate, magnesium hydroxy carbonate, magnesium bicarbonate, magnesium nitrate, and magnesium chloride, and magnesium-containing clays such as dolomite, saponite, and sepiolite.

It is noted that a water-insoluble trivalent metal source has to be used if the divalent metal source is water-soluble.

Preferred divalent metal sources for the preparation of metal-doped anionic clays are oxides, hydroxides, carbonates, hydroxycarbonates, bicarbonates, and (hydroxy)acetates, as these materials are relatively inexpensive. Moreover, these materials do not leave anions in the metal-doped anionic clay which either have to be washed out or will be emitted as environmentally harmful gases upon heating.

As mentioned before, also metal-doped divalent and trivalent metal sources can be used for the preparation of metal-doped anionic clays. Examples of such metal sources are metal-doped (pseudo)boehmite, metal-doped $Mg(OH)_2$, and metal-doped MgO.

Use can be made of Mg—Al anionic clays, Al-containing non-Mg anionic clays, Mg-containing non-Al anionic clays, or non-Mg non-Al anionic clays.

Preferred anionic clays for the present invention are Mg—Al anionic clays, i.e. those which contain aluminium as the trivalent and magnesium as the divalent metal, having a ratio of divalent to trivalent metal from about 0.1 to about 10, preferably from about 1 to about 6, and more preferably from about 2 to about 4. The most preferred ratio is close to about 3.

Suitable Mg—Al anionic clays preferably have either the conventional $3R_1$ stacking or the $3R_2$ stacking according to WO 01/12550. These two types of anionic clays have a three-layer repeat. They are distinguished from each other by the intensities of the (107) and (108) X-ray reflections. The (107) and (108) reflections are generally positioned close to 45 and 47 degrees 2-theta, respectively. In $3R_2$-type anionic clays the (107) reflection is stronger than the (108) reflection, whereas in $3R_1$-type anionic clays the (108) reflection is stronger than the (107) reflection. The presence of peaks at 45 and 47 degrees 2-theta with comparable intensity suggests the presence of a mixture of these two types of anionic clay. It is to be understood that the precise 2-theta values for the (107) and (108) reflections will depend on the lattice parameters for the Mg—Al anionic clay. There are more differences in the X-ray diffraction pattern, but these are the best distinguishable reflections, because other compounds which are likely to be present in the Mg—Al anionic clay-like material have hardly any reflections around 45–47° 2-theta. Although boehmite has a weak reflection in that range, its presence can be excluded if its strong reflection between 13 and 15 degrees 2-theta is absent.

$3R_2$-type anionic clays appear to have a different morphology from $3R_1$-type anionic clays. The $3R_2$-type anionic clay appears to have a structure with irregular flake-like platelets which are randomly agglomerated. Conventional $3R_1$-type anionic clay has regular well-formed layers of platelets which are arranged in the usual bookstack form. For more information about different stacking orders of anionic clays reference may be had to Bookin and Drits, *Clay and Clay Minerals*, Vol. 41, No.5, pages 551–557 and pages 558–564.

The anionic clay is doped with one or more metal dopants. Preferred metal dopants are compounds of the elements selected from the group of zinc, vanadium, iron, copper, tungsten, molybdenum, cobalt, niobium, nickel, chromium, cobalt, rare earth metals, e.g. lanthanum and/or cerium, and combinations thereof. More preferred elements are zinc, vanadium, iron, tungsten, molybdenum, cerium, and combinations thereof.

If more than one metal dopant is used, it is preferred to use a combination of a Zn-containing compound and a V-containing compound, a combination of a Zn-containing compound and a W-containing compound, a combination of a Ce-containing compound and a V-containing compound, a combination of a Fe-containing compound and a V-containing compound, a combination of a Zn-containing compound, a V-containing compound, and a W-containing compound, a combination of a Fe-containing compound and a Ce-containing compound, or a combination of a Mo-containing compound and a W-containing compound.

Suitable compounds containing the desired elements are their nitrates, sulfates, chlorides, formates, acetates, oxalates, alkoxides, carbonates, vanadates, molybdates, borates, phosphates, etc.

The metal dopant(s) is/are preferably present in the anionic clay in amounts of less than about 70 wt %, more preferably between about 2 and about 50 wt %, even more preferably between about 2 and about 30 wt %, and most preferably between about 2 and about 20 wt %, calculated as metal oxide and based on the weight of metal-doped anionic clay.

If desired, the metal-doped anionic clay may be subjected to ion-exchange. Upon ion-exchange the interlayer charge-balancing anions are replaced with other anions. Said other anions are the ones commonly present in anionic clays and include pillaring anions such as $V_2O_7^{4-}$, $HV_2O_{12}^{4-}$, $V_3O_9^{3-}$, $V_{10}O_{28}^{-6}$, $Mo_7O_{24}^{6-}$, $PW_{12}O_{40}^{3-}$, $B(OH)_4^-$, $[B_3O_3(OH)_4]^-$, $[B_3O_3(OH)_5]^{2-}$, $B_4O_5(OH)_4^{2-}$, $HBO_4^{2-}$, $HGaO_3^{2-}$, $CrO_4^{2-}$, Keggin-ions, formate, acetate, phosphates, tungstates, and mixtures thereof. Examples of suitable pillaring anions are given in U.S. Pat. No. 4,774,212, which is included by reference for this purpose. Said ion-exchange can be conducted before or after drying the anionic clay-containing composition formed in the suspension.

Zeolites

Preferred zeolites to be used in the catalyst composition of the present invention are pentasil zeolites (e.g. ZSM-5, zeolite beta) optionally containing phosphate, rare earth metal(s) (e.g. RE-ZSM-5), and/or transition metal(s) such as Fe, V, and Zn, and/or faujasite zeolites (e.g. zeolite X, Y, LZ-210), optionally ultrastabilised (USY), dealuminated, and/or exchanged with alkaline earth metals, transition metals, and/or rare earth metals. The preferred zeolite is a rare earth-exchanged zeolite Y or USY with a SAR between about 4.0 and about 6.0, preferably between about 5.0 and about 6.0.

Alumina

Suitable aluminas or alumina sources for the present invention include pseudoboehmite, alumina gel, alumina sol, aluminium chlorohydrol, or aluminium nitrohydrol. The alumina may be peptised with (in)organic acids.

Silica

The composition optionally contains silica. Suitable silica sources are silica gels, silica sols, and Si—Al co-gels. A preferred silica source is silica hydrosol. Silica hydrosols can be prepared by neutralisation of an acidic sodium silicate solution or by ion-exchange of sodium silicate.

The presence of silica is especially preferred if pseudoboehmite is used as matrix material.

Kaolin

The term "kaolin" includes any form of kaolin, such as metakaolin, calcined kaolin, leached kaolin, dealuminated kaolin, etc.

Other Ingredients

The composition may also contain other ingredients frequently used in FCC catalysts, such as metal traps, CO combustion promotors, etc. Examples of such other ingredients include alumina-titania, titania, zirconia, cationic clay, alkaline earth metal (hydr)oxides, borates, phosphates, aluminium phosphates, palladium, and platinum.

The term "cationic clay" includes smectites (e.g. saponite, montmorillonite, bentonite, laponite, hectorite), phosphated smectites, calcined smectites, leached smectites and/or dealuminated smectites.

The catalyst composition is suitable for the production of fuels, such as gasoline and diesel, with relatively low sulfur and nitrogen content. The catalyst composition is especially suitable for the production of said fuels from resid-containing oil feeds.

EXAMPLES

Comparative Example 1

An anionic clay was prepared by suspending 1,250 g MgO and 1,210 g flash-calcined gibbsite (Alcoa CP-3®) in 7,540 g water. This mixture was aged at 170° C. for 1 hour under autogeneous pressure. The suspension was filtered and the product was dried at 120° C.

Figure 2:
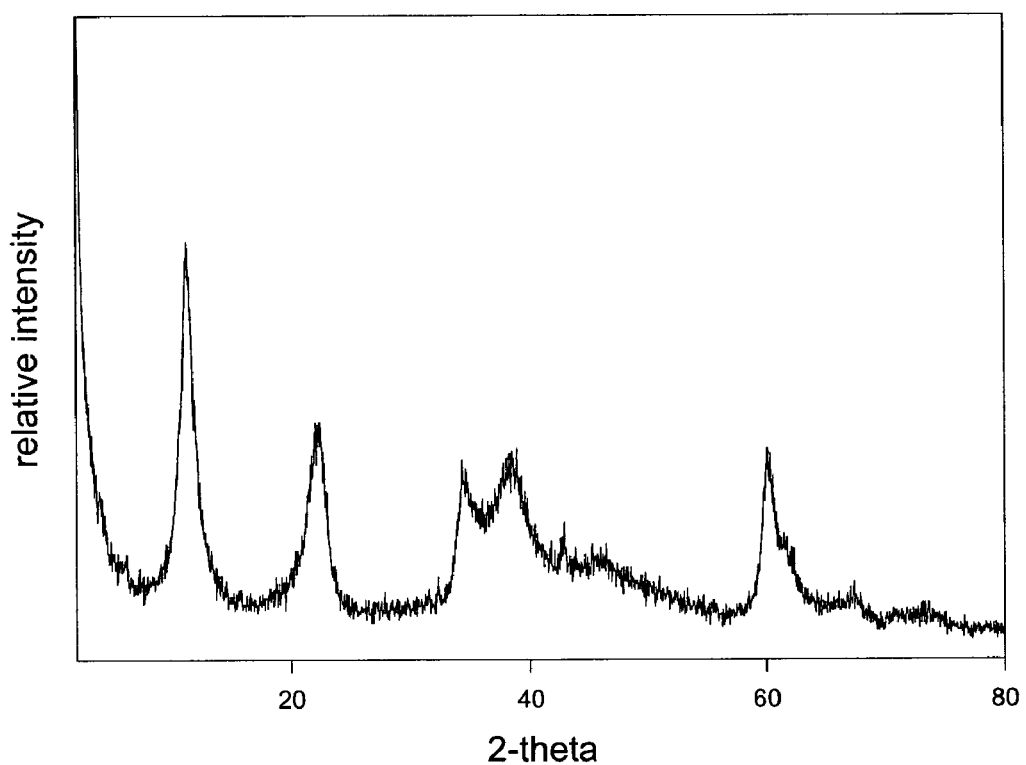
FIG. 2 shows an X-ray diffraction pattern of a non-doped, non-impregnated anionic clay.

The X-ray diffraction pattern of the resulting non-doped, non-impregnated Mg—Al anionic clay is presented in FIG. 2.

A catalyst was prepared by slurrying 10 wt % (on dry base) of the anionic clay with 25 wt % RE-USY zeolite, 30 wt % of a pseudoboehmite peptized with 0.15 mol $HNO_3$ per mol of $Al_2O_3$, 5 wt % silicasol, and balance kaolin, followed by spray-drying.

Comparative Example 2

An anionic clay was prepared according to Comparative Example 1, except that the resulting anionic clay was impregnated with an aqueous solution of zinc nitrate, using pore volume impregnation. The resulting product had a Zn-content, calculated as ZnO, of 3.5 wt %, and is representative of the prior art WO 99/49001.

Figure 3:
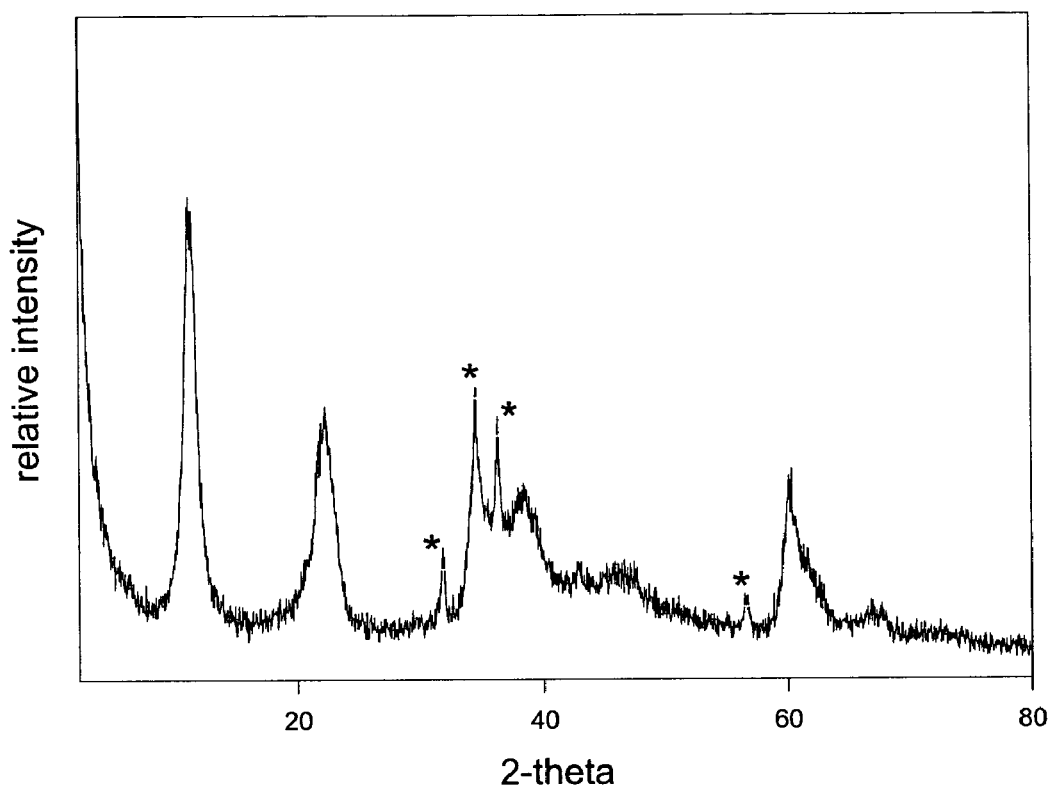
FIG. 3 shows an X-ray diffraction pattern of a Zn-impregnated anionic clay.

The X-ray diffraction pattern of the resulting Zn-impregnated Mg—Al anionic clay is presented in FIG. 3. This pattern shows, compared to the pattern of non-doped and non-impregnated anionic clay (FIG. 1), additional reflections at about 31.8, 34.4, 36.3, and 56.6 degrees 2-theta (indicated by: *). These additional reflections indicate the presence of a separate ZnO-phase.

A catalyst was prepared by slurrying 10 wt % (on dry base) of the Zn-impregnated anionic clay with 25 wt % RE-USY zeolite, 30 wt % of a pseudoboehmite peptized with 0.15 mol $HNO_3$ per mol of $Al_2O_3$, 5 wt % silicasol, and balance kaolin, followed by spray-drying.

Example 3

An anionic clay was prepared according to Comparative Example 1, except that the anionic clay was calcined and subsequently rehydrated in the presence of zinc nitrate. The resulting doped anionic clay had a Zn-content, calculated as ZnO, of 3.5 wt %.

Figure 4:
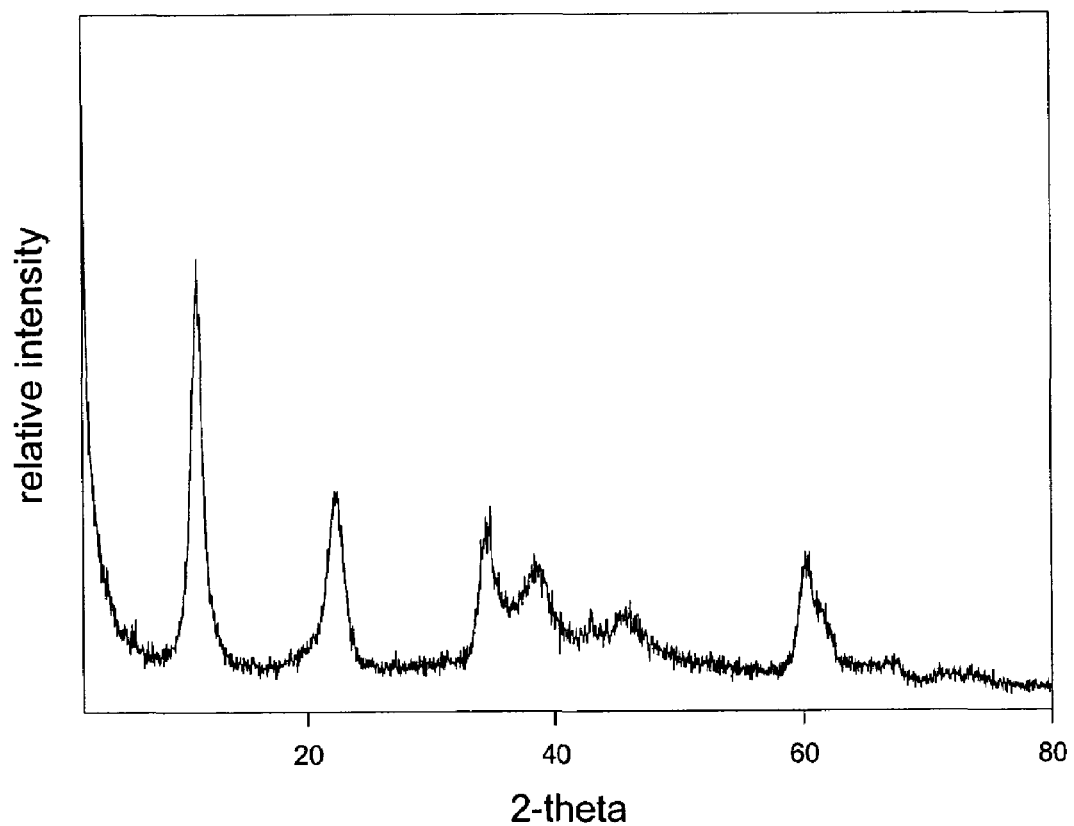
FIG. 4 shows an X-ray diffraction pattern of a Zn-doped anionic clay, whereby the Zn was introduced during rehydration.

The X-ray diffraction pattern of the resulting Zn-doped Mg—Al anionic clay is presented in FIG. 4. It is clear that the separate ZnO-phase which was present in the Zn-impregnated anionic clay of Comparative Example 2 (FIG. 2) is not present in this Zn-doped anionic clay. The diffraction pattern of the Zn-doped anionic clay is equivalent to the diffraction pattern of the non-doped non-impregnated anionic clay of FIG. 2, indicating a more homogeneous distribution of the Zn-phase within the doped anionic clay compared to the impregnated anionic clay of Comparative Example 2.

A catalyst was prepared by slurrying 10 wt % (on dry base) of the Zn-doped anionic clay with 25 wt % RE-USY zeolite, 30 wt % of a pseudoboehmite peptized with 0.15 mol $HNO_3$ per mol of $Al_2O_3$, 5 wt % silicasol, and balance kaolin, followed by spray-drying.

Example 4

An anionic clay was prepared by suspending 1,190 g MgO, 800 g FC-BOC (Alcoa CP-3®), and 300 g $Zn(NO_3)$ $_2$.6H$_2$O in 7,500 g water. This mixture was aged at 170° C. under autogeneous pressure for 1 hour. The suspension was filtered and the product was dried at 120° C. The resulting doped anionic clay had a Zn-content, calculated as ZnO, of 4 wt %.

Figure 5:
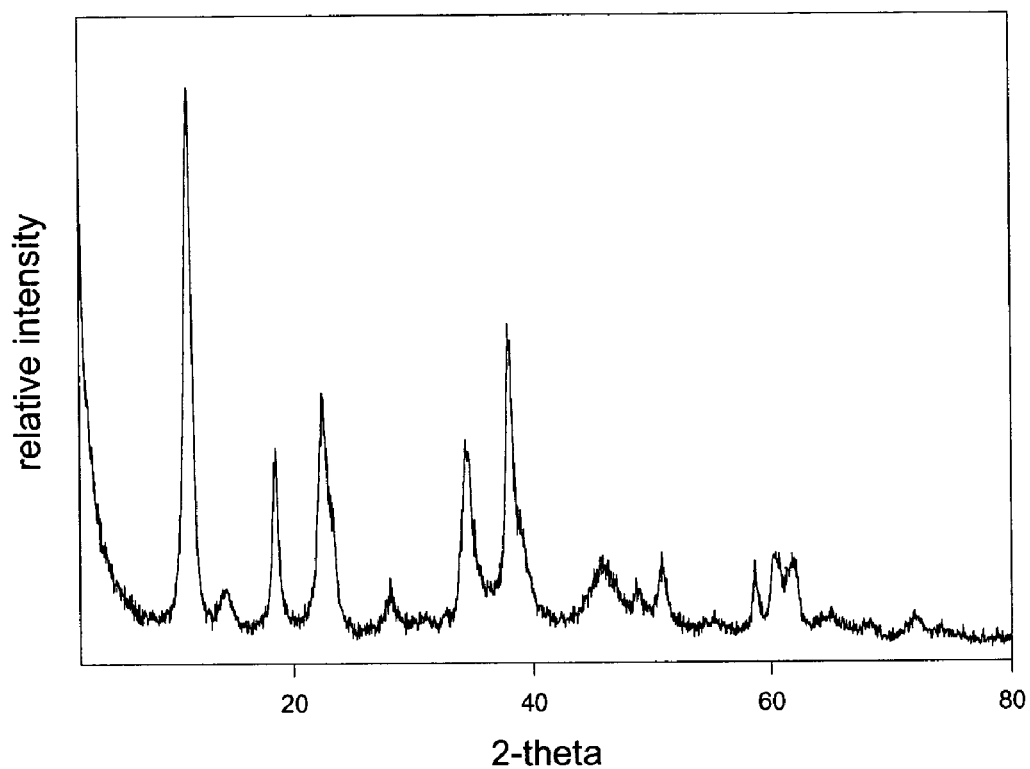
FIG. 5 shows an X-ray diffraction pattern of a Zn-doped anionic clay, whereby the Zn was present during aging.

The X-ray diffraction pattern of the resulting Zn-doped Mg—Al anionic clay is presented in FIG. 5. This pattern indicates the presence of anionic clay, boehmite, and brucite (Mg(OH)$_2$). A separate ZnO-phase was not detected, as indicated by the absence of reflection at 31.8, 34.4, 36.3, and 56.6 degrees 2-theta. Hence, also this way of doping leads to a more homogeneous distribution of the Zn-phase within the product than impregnation.

A catalyst was prepared by slurrying 10 wt % (on dry base) of the Zn-doped anionic clay with 25 wt % RE-USY zeolite, 30 wt % of a pseudoboehmite peptized with 0.15 mol HNO$_3$ per mol of Al$_2$O$_3$, 5 wt % silicasol, and balance kaolin, followed by spray-drying.

Comparative Example 5

An anionic clay was prepared according to Comparative Example 1, except that the resulting anionic clay was impregnated with an aqueous solution of cerium nitrate, using pore volume impregnation. The resulting product had a Ce-content, calculated as CeO, of 11 wt %.

Figure 6:
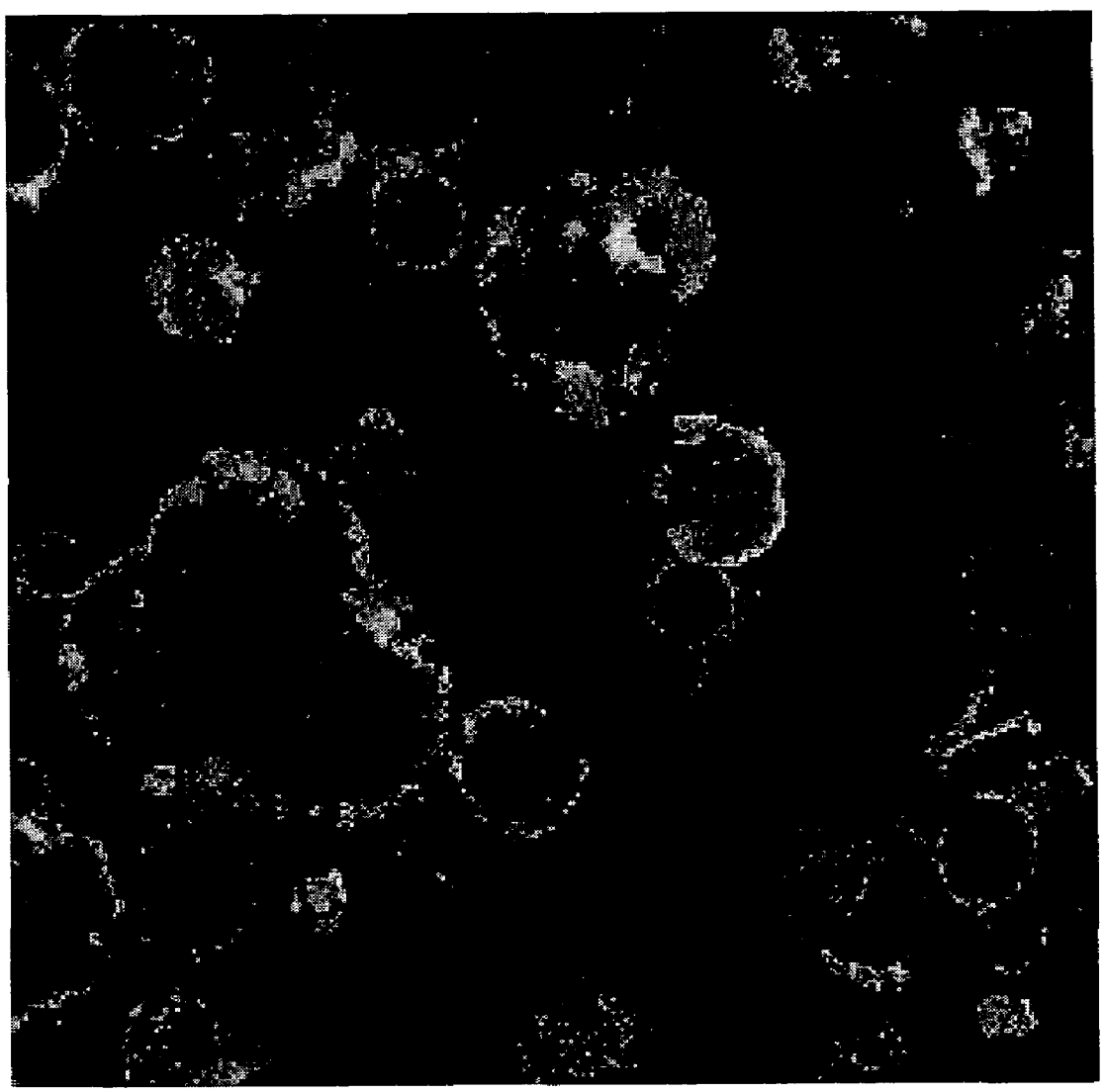
FIG. 6 shows an electron microscopy photograph of a Ce-impregnated anionic clay.

FIG. 6 presents an electron microscopy photograph of this Ce-impregnated Mg—Al anionic clay, with the Ce-distribution indicated in white. It is clear the Ce is not homogeneously distributed in the anionic clay particles, but is mainly present on the exterior of the particles.

Example 6

Figure 7:
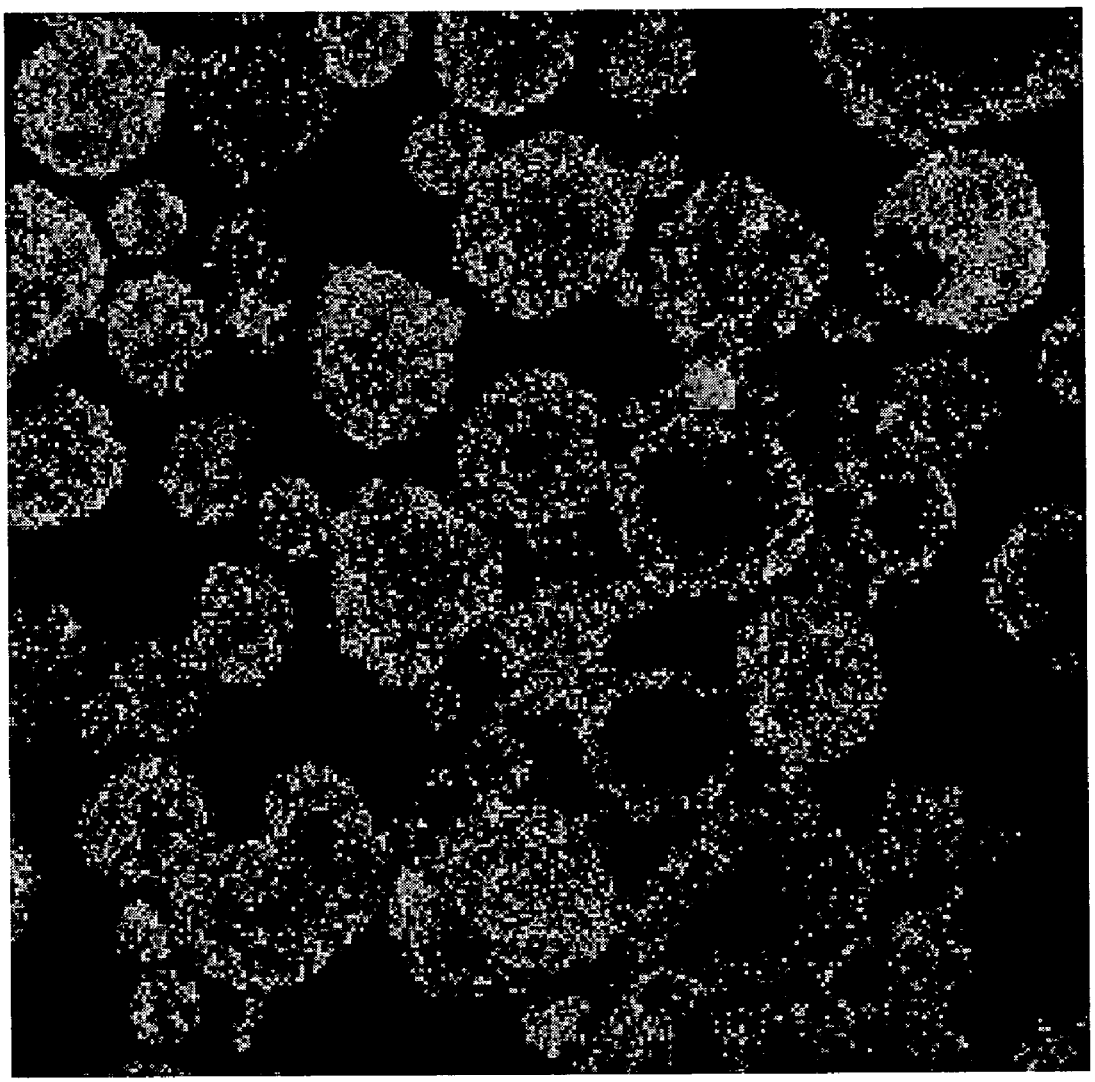
FIG. 7 shows an electron microscopy photograph of a Ce-doped anionic clay.

A Ce-doped anionic clay was prepared according to the method of Example 4, except that zinc nitrate was replaced by cerium nitrate. FIG. 7 presents an electron microscopy photograph of this Ce-doped Mg—Al anionic clay, with the Ce-distribution indicated in white. It is clear the Ce in this clay is more homogeneously distributed that in the Ce-impregnated anionic clay of Comparative Example 5.

Example 7

The catalyst compositions according to Example 4 and Comparative Examples 1 and 2 were tested in an FCC unit. The sulfur concentration in the resulting gasoline at 65 wt % conversion amounted to 1,434, 1,759, and 1,735 ppmw, respectively. Hence, the use of a Zn-doped anionic clay resulted in a sulfur reduction which was 17% higher than the sulfur reduction resulting from the use of a Zn-impregnated anionic clay.

The invention claimed is:

1. A catalyst composition comprising about 5–55 wt % metal-doped anionic clay, about 10–50 wt % zeolite, about 5–40 wt % matrix alumina, about 0–10 wt % silica, about 0–10 wt % of other ingredients, and the balance kaolin, said anionic clay obtained by a process comprising mixing a trivalent metal source and a divalent metal source, at least one of them being water-insoluble, in aqueous suspension.

2. The catalyst composition of claim 1 wherein the anionic clay is doped with at least one compound containing an element selected from the group consisting of Zn, Fe, V, Cu, W, Mo, Co, Nb, Ni, Cr, Ce, and La.

3. The catalyst composition of claim 1 wherein the anionic clay is an Al—Mg containing anionic clay, an Al-containing non-Mg anionic clay, a Mg-containing non-Al anionic clay, or a non-Mg non-Al anionic clay.

4. A process for the preparation of the catalyst composition of claim 1 wherein zeolite, metal-doped anionic clay, alumina, kaolin, and optionally silica and other ingredients are mixed in aqueous suspension and subsequently shaped to form particles.

5. The process of claim 4 wherein the metal-doped anionic clay is obtained by aging the mixture of trivalent metal source and divalent metal source in the presence of at least one metal dopant.

6. The process of claim 5 wherein the trivalent metal is selected from the group consisting of aluminium, gallium, indium, iron, chromium, vanadium, cobalt, manganese, cerium, niobium, lanthanum, and combinations thereof.

7. The process of claim 5 wherein the divalent metal source and/or the trivalent metal source are selected from the group consisting of oxides, hydroxides, carbonates, hydroxycarbonates, bicarbonates, acetates, and hydroxyacetates.

8. The process of claim 5 wherein the divalent metal is selected from the group consisting of magnesium, zinc, nickel, copper, iron, cobalt, manganese, calcium, barium, and combinations thereof.

9. The process of claim 5, wherein use is made of a metal-doped divalent and/or metal-doped trivalent metal source.

10. The process of claim 4 wherein the metal-doped anionic clay is obtained by aging a trivalent metal source and a divalent metal source, at least one of them being water-insoluble, in aqueous suspension to form an anionic clay, thermally treating the anionic clay to form a solid solution, and rehydrating the solid solution in the presence of at least one metal dopant to form a metal-doped anionic clay.

11. The process of claim 10 wherein the trivalent metal is selected from the group consisting of aluminium, gallium, indium, iron, chromium, vanadium, cobalt, manganese, cerium, niobium, lanthanum, and combinations thereof.

12. The process of claim 10 wherein the divalent metal source and/or the trivalent metal source are selected from the group consisting of oxides, hydroxides, carbonates, hydroxycarbonates, bicarbonates, acetates, and hydroxyacetates.

13. The process of claim 10 wherein the divalent metal is selected from the group consisting of magnesium, zinc, nickel, copper, iron, cobalt, manganese, calcium, barium, and combinations thereof.

14. The process of claim 10, wherein use is made of a metal-doped divalent and/or metal-doped trivalent metal source.

15. A process for the production of gasoline and/or diesel having a reduced sulfur content and/or a reduced nitrogen content comprising contacting a hydrocarbon feedstock with the catalyst composition of claim 1 at fluid catalytic cracking conditions.

* * * * *